United States Patent [19]

Bernasconi et al.

[11] 4,151,760
[45] May 1, 1979

[54] APPARATUS FOR ROTATING MULTIPLY-MOUNTED SHAFTING

[75] Inventors: Felix Bernasconi, Zollikerberg, Switzerland; Uwe Blum, Albbruck, Fed. Rep. of Germany; Alfred Pesendorfer, Mandach, Switzerland

[73] Assignee: BBC Brown, Boveri & Company Limited, Baden, Switzerland

[21] Appl. No.: 801,010

[22] Filed: May 26, 1977

[30] Foreign Application Priority Data

Jun. 11, 1976 [CH] Switzerland ................... 7405/76

[51] Int. Cl.² .................................... F16H 35/00
[52] U.S. Cl. .................... 74/840; 308/1 A; 308/DIG. 10; 308/DIG. 15; 415/1
[58] Field of Search .............. 415/122 R, 126, 1; 60/483, 458; 308/1 A, 1 R, 35, DIG. 10, DIG. 15; 74/840

[56] References Cited

U.S. PATENT DOCUMENTS

| | | | |
|---|---|---|---|
| 1,114,668 | 10/1914 | Ash et al. ........................... | 308/1 A |
| 1,553,149 | 9/1925 | Doran ................................ | 308/1 A |
| 3,679,035 | 7/1972 | Schmitt ........................... | 308/1 A X |
| 3,871,442 | 3/1975 | Finnemore ...................... | 308/35 X |
| 3,917,363 | 11/1975 | Korting ............................. | 308/35 |
| 3,958,419 | 5/1976 | Laing ............................. | 60/483 X |
| 4,000,559 | 1/1977 | Korrenn et al. .................. | 308/35 |

*Primary Examiner*—Roy D. Frazier
*Assistant Examiner*—William E. Lyddane
*Attorney, Agent, or Firm*—Werner W. Kleeman

[57] ABSTRACT

An apparatus for rotating multiply-mounted shafting, comprising a rotational device for the continuous rotation of the shafting at a first rotational speed and an auxiliary rotational device for the continuous or intermittent rotation of the shafting at a second rotational speed which is lower in relation to the first rotational speed. There is provided at least one lifting device having an engaged part arranged at the shafting. Also there is provided an engagement member acting upon the engaged part for lifting the shafting and a drive mechanism which produces the requisite engaging force in order to move the engaged part.

33 Claims, 10 Drawing Figures

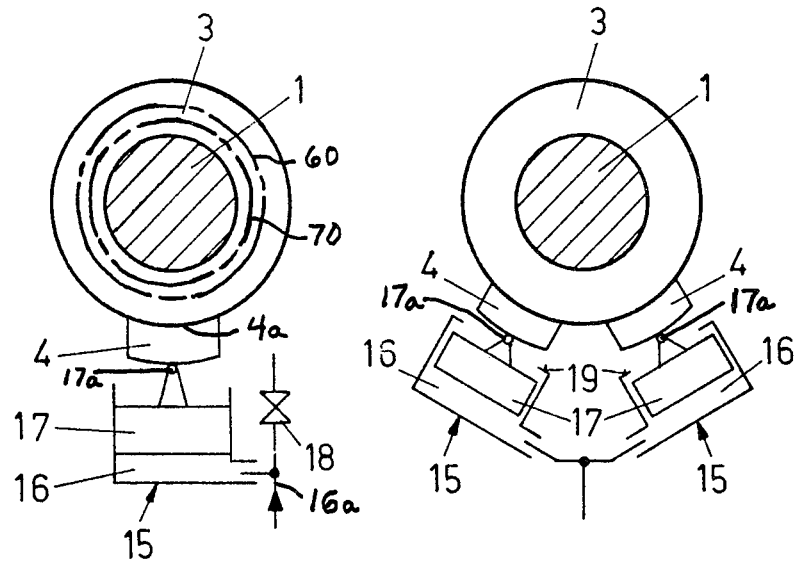
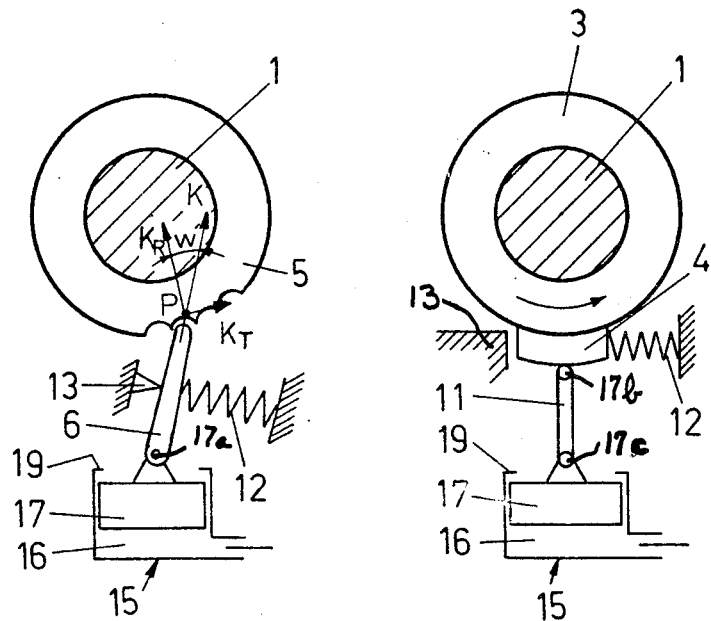
FIG.1    FIG.2
FIG.3    FIG.4

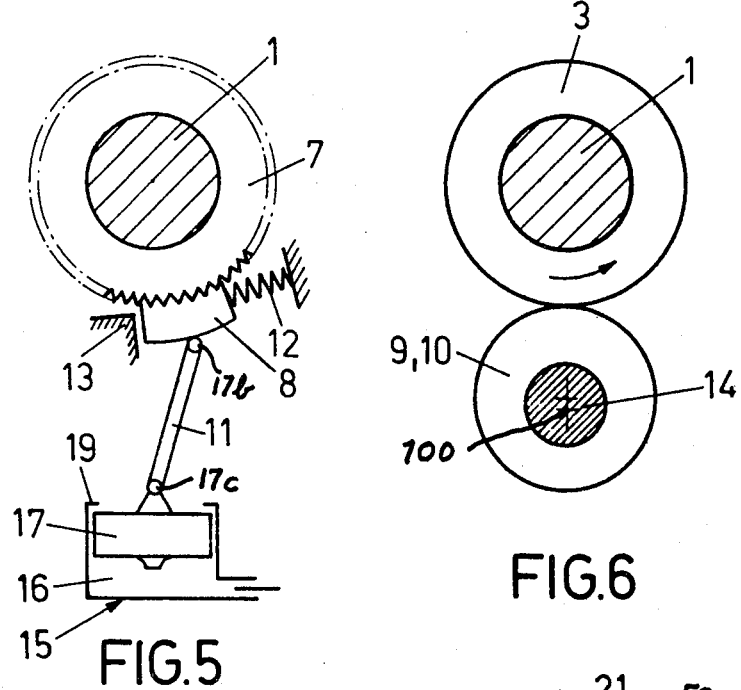
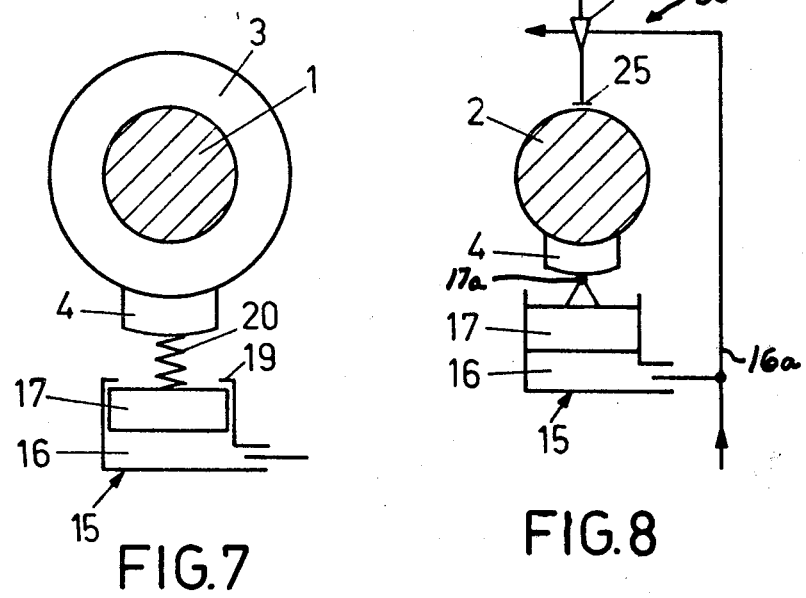

APPARATUS FOR ROTATING MULTIPLY-MOUNTED SHAFTING

BACKGROUND OF THE INVENTION

The present invention relates to a new and improved construction of apparatus for rotating a multiply-mounted shafting, which is of the type comprising a rotational or rotative device for the continuous rotation of the shafting at a first rotational speed and an auxiliary rotational or rotative device for the continuous or intermittent rotation of the shafting at a second rotational speed which is lower in comparison to the first rotational speed.

At different stages during the operation of a thermal turbo-machine there can arise different disturbances, usually caused by thermal conditions. An internal secondary flow extending in the peripheral-and/or lengthwise direction of the rotor can lead to irregular heating or cooling of the rotor periphery and can result in warping or distortion of the rotor. The same secondary flow, in addition to different insulation losses arising in the casing or housing, causes distortion of such casing or housing. The distortion of the rotor and casing, in extreme cases, can result in scraping of the blades or buckets, i.e. in contact with the sealing portions and can even totally prevent any further rotation of the rotor. Even slight distortion of the rotor can result in impermissible vibrations due to imbalance upon restarting of the machine. In order to avoid these disturbances it is conventional practice to rotate the rotors continuously or intermittently, at rotational speeds which are advantageously pre-selected in consideration of the different operating stages and the momentary prevailing conditions.

During operation of a steam turbine installation there arise a number of so-called "critical periods", which require undertaking measures in the interest of providing the requisite operational safety and operational preparedness. Prior to start of the turbine there is initially placed into operation the steam generator, the vapor is condensed in the condenser and the labyrinth seals of the rotor are blocked with moderately hot vapor. In order to avoid impermissible distortion of the rotors such are rotated, as a function of their slimness and the temperature distribution, at such rapidity that there does not occur any scraping of the rotor-sealing parts or other critical locations; and for instance one-half of a revolution (180°) carried out intermittently each half hour is sufficient for this purpose.

Upon start of the steam turbine assembly the residual distortion however is still so great that during running-up and passing through the resonance locations there occurs scraping. This residual distortion can be avoided by remaining over a longer period of time at lower starting rotational speeds, since in this way there is accomplished temperature equalization at the periphery of the rotor and there is eliminated rotor distortion. Such prolongation of the starting period is, however, undesired and it can be avoided by preliminary rotation of the rotor drive shafting at a minimum rotational speed of, for instance, 1 revolution per minute.

In the case of large steam turbines of 100 to 2000 MW containing two- or four-pole generators the rotor drive shafting is rotated at higher rotational speeds, between approximately 5 and 50 revolutions per minute or even greater, so that a hydrodynamic lubricant film is formed in the sliding or friction bearings, and there is thus avoided or reduced the wear of the bearings at the mixed friction zone.

Also the rotor of a generator can distort prior to start of the equipment, for instance when it must be energized, whether such be for pre-heating the windings and the rotor body or for synchronization of the generators of cross-compound assemblies prior to start-up, especially with low excitation current.

Too rapid rotation of the rotor shafting can be, however, disadvantageous in a number of respects. Thus, for instance, the prongs or points of the pine tree-like or serrated base of the buckets may be subject to impermissibly rapid wear, since the buckets, during each revolution, tend to vibrate or shake back and forth tangentially in their groove. If the bearing is equipped with high pressure lubrication in order to effectively reduce the friction during start of the shafting, then it can happen that due to the effects of dirt particles the shaft and the bearing metal are scratched and the high pressure lubrication and the oil wedge lubrication are ineffective at, for instance, 50 revolutions per minute. The consequence of this is slow wear of the bearings with attendant formation of a larger "support area" and an increase in play. This can be reduced by slower rotation.

Therefore, it is conventional to equip an installation of the aforementioned type with two devices for the rotation of the shafting. One of these is the standard rotational or rotative device which rotates the shafting at a rotational speed in the order of between 5 and 50 revolutions per minute so rapidly that there is insured for a so-called "vacuum drawing" with the attendant sealing of the labyrinths and subsequent running-up of the equipment in the shortest possible time without scraping and danger of scraping due to mechanically impermissible vibrations.

The other rotational device is an auxiliary rotational device which, as is usual, is arranged at one end of the shafting and generally comprises an intermittently rotating pawl device, however, also can be constituted by a continuously rotating device, operating at a rotational speed in the order of between 1 and 60 revolutions per hour, which is only rotated so rapidly that there is avoided a scraping at lower rotational speeds. If necessary, it can also be employed for overcoming the static friction, i.e. for starting the shafting, whereafter the standard rotational device then assumes rotation of the equipment.

Although the conventional auxiliary rotational devices fulfill their function quite well for many fields of application, there are however instances where the resistance-rotational moment is too great due to some type of disturbance in order to successfully overcome this condition by means of the auxiliary rotational device. Additionally, such arrangement is devoid of means which adequately informs the operator about the nature of an existing disturbance, so that the operator can decide whether and how the shafting should be rotated. This is especially disadvantageous in the case of nuclear power plants of the boiling water reactor type, since in such case the vapor is easily radioactive, and the shafting, the bearings, the rotational device and the auxiliary rotational device are only accessible with difficulty during operation to the plant personnel.

SUMMARY OF THE INVENTION

Hence, with the foregoing in mind it is a primary object of the present invention to provide a new and improved construction of apparatus for rotating a multiply-mounted shafting in a manner not associated with the aforementioned drawbacks and limitations of the prior art proposals.

Another and more specific object of the present invention aims at the provision of means which are suitable for overcoming larger rotational moments than can be handled by the standard or conventional auxiliary rotational devices, and which renders possible rotation of the shafting also in the presence of disturbances which arise during normal operation of the rotational device or the auxiliary rotational device.

Now in order to implement these and still further objects of the invention which will become more readily apparent as the description proceeds, the apparatus of the present development for solving the aforementioned objectives is manifested by the features that there is provided at least one lifting device having an engaged part arranged at the shafting, an engagement member acting upon the engaged part for lifting the shafting, and a drive device or mechanism which produces the necessary engagement force in order to move the engagement member.

The apparatus of the invention possesses the following advantages: there can be overcome larger rotational moments than is possible with the heretofore known auxiliary rotational devices, and the shafting also can be rotated even in the presence of possibly arising disturbances. Also, according to the invention there can be provided a monitoring device which monitors the different devices and provides sufficient information to the operator about prevailing disturbances in order to allow the operator to sensibly decide about the further operation of the equipment. Also, there can be provided an automatic mechanism for the localization of the disturbances, which for instance, in the case of nuclear power plants of the boiling water reactor type, renders possible the requisite remote control of the operation of the plant.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically illustrates a lifting device equipped with a sliding shoe or pressure pad which is articulated with a hydraulic piston;

FIG. 2 schematically illustrates an arrangement utilizing two lifting devices for each lifting location;

FIG. 3 schematically illustrates a lifting device employing a pawl and ratchet wheel;

FIG. 4 schematically illustrates a lifting device equipped with a sliding shoe and hydraulic piston and a connection element which operatively interconnects such components;

FIG. 5 schematically illustrates a lifting device equipped with a toothed shoe which engages into a toothed wheel rim;

FIG. 6 schematically illustrates a lifting device wherein the engagement member is constituted by an eccentric or cam;

FIG. 7 schematically illustrates a lifting device employing a spring for limiting the lifting force;

FIG. 8 schematically illustrates a lifting device equipped with mechanism for the hydraulic control of the lifting movement of the engagement member;

DETAILED DESCRIPTION OF THE PREFERRED EMBODIMENTS

Figure 9:
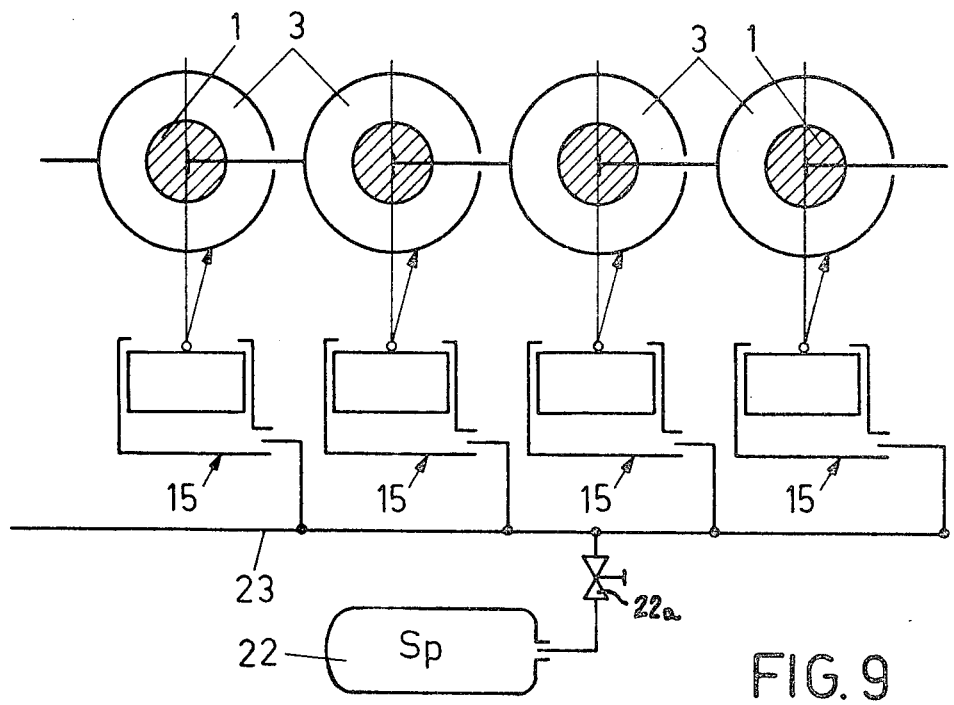
FIG. 9 schematically illustrates an apparatus equipped with four lifting devices and a storage connected with their supply lines or conduits.

Turning attention now to the drawings, it is to be understood that throughout the various figures the same or analogous components have been generally designated by the same reference characters. In the arrangement of FIG. 1 the engagement member of the lifting device comprises a sliding shoe 4 having a concave engaging surface 4a which can be brought into engagement with a coupling flange 3 constituting the engaged part by actuating the hydraulic device 15 embodying a cylinder 16 and a piston 17 for the purpose of lifting the shafting 1. The sliding shoe 4 or equivalent structure, which can be lubricated with oil at a high pressure, is hingedly connected at pivot 17a with the piston 17. A pressure limiting valve 18 which is provided in the supply line 16a of the cylinder 16 serves to limit the drive force. This drive force is directed radially upwards and therefore serves as a purely lifting force.

Also, it will be seen that in FIG. 1 there has been schematically indicated by reference character 60 a rotative or rotational device for the continuous rotation of the shafting 1 at a first rotational speed and by reference character 70 an auxiliary rotational or rotative device for either the continuous, but usually typically intermittent rotation, of the shafting at a second rotational speed which is lower in relation to the first rotational speed. Both of these rotative devices 60 and 70 are of conventional construction, as heretofore mentioned, constituting standard drives which can be disengaged from the shafting 1. A similar not otherwise shown arrangement of such two drives would be provided for the other embodiments herein disclosed, with the exception that in those instances where the lifting device also carries out a rotational action upon the shafting 1 the auxiliary rotational device 70 can be omitted and the dual function-lifting device i.e. accomplished both lifting and rotation of the shafting 1, then serves as the auxiliary rotational device.

With the arrangement of FIG. 2 there are symmetrically arranged at one lifting location two lifting devices relative to the vertical, thereby obtaining a defined position of the shaft center. Both of these lifting devices are essentially the same as the lifting device illustrated and described in conjunction with FIG. 1, but in this case there are provided the stops 19 which serve to limit the stroke of the hydraulic piston and thus the movement of the sliding shoes 4. Also with this embodiment there are only effective lifting components or forces, since the other components or forces mutually cancel one another as will be readily apparent.

With the embodiment of FIG. 3 the pawl 6 which is hingedly connected at pivot 17a with the piston 17, and which pawl here serves as the engagement member, acts upon the ratchet wheel 5 serving as the engaged part. In this case there is not only accomplished a lifting action, but also a rotation of the shafting 1. A return or restoring spring 12 urges the pawl 6 against a fixed lateral stop or impact member 13 and thus contributes to the engagement of the pawl 6 with the next tooth of the ratchet wheel 5.

With this arrangement the drive force K engages at the point of attack P of the ratchet wheel 5 and has an effective direction which together with a radial line passing through the point of attack P forms an acute angle W such that the radial component $K_R$ produces a radial movement and by virtue of the prevailing tangential component $K_T$ of the moment of rotation produced by the force K there is also accomplished a rotational movement of the shafting 1.

With the embodiment shown in FIG. 4 a connection element 11 is pivotably connected at locations 17b and 17c between the sliding shoe 4 and the hydraulic device 15 and provides an articulated connection between such sliding shoe 4 and the hydraulic device 15. This connection element 11 transmits the drive force from the hydraulic device 15 to the sliding shoe 4. The stop or stop means 19 serves to limit the movement of the piston 17 and thus the sliding shoe 4. Here also the return spring 12 presses the sliding shoe 4 against the lateral stop 13 when there has been initiated the rotational movement of the shafting 1. The drive force is directed radially upwards and also in this case acts as a purely lifting force.

With the embodiment according to FIG. 5 the lifting device is similar to that of FIG. 4, with the difference that the engagement member here is in the form of a finely toothed shoe 8 which can be brought into engagement with the finely toothed-tooth rim 7 for lifting the shafting 1. The drive force also in this case is directed such that the shafting 1 experiences both a radial movement as well as also a rotational movement.

With the arrangement of FIG. 6 the engagement member is in the form of an eccentric 9 or a cam 10 which is driven through the intermediary of the auxiliary shaft 14 by means of any suitable and therefore merely schematically illustrated conventional electrical or mechanical rotational device serving as the drive device, and generally indicated by reference character 100. Also in this case the coupling flange 3 and therefore the shafting 1 experiences a lifting movement and a simultaneous rotational movement.

With the embodiment shown in FIG. 7 the lifting device is similar to that of FIG. 1, however it differs therefrom inasmuch as here a spring 20 is provided between the sliding shoe 4 and the piston 17 for the purpose of limiting the drive force which is intended to be exerted upon the sliding shoe 4 by the stroke of the piston 17 which is limited by the stop or impact member 19.

The lifting device of the arrangement of FIG. 8 is also similar to that of FIG. 1, with the difference that the sliding shoe 4 directly acts upon the shaft journal 2 forming a section of the shafting 1. A hydraulic control device, generally indicated by reference character 50, and provided for controlling the movement of the sliding shoe 4 possesses a feeler or sensor 25 which scans or senses the momentary position of the shaft journal 2 and an outflow or discharge valve 21 which is controlled by such feeler 25. Upon reaching a desired upper position of the shaft journal 2 this outflow valve 21 becomes effective in such a manner that additional hydraulic liquid is withdrawn from the supply line or conduit 16a which feeds the cylinder 16, so that the piston 17 can be brought to standstill.

With the arrangement of FIG. 9 there are illustrated four lifting devices disposed at the related shafting 1 and containing the hydraulic devices 15 serving as the drive devices, the coupling flanges 3 as the engaged parts and the engagement members which here have been merely schematically indicated by the arrows, but may be like any of the engagement members heretofore described with the exception of the arrangement of FIG. 6. A disconnectable storage 22 is connected by the valve means 22a or equivalent structure with a common supply line or conduit 23 for the hydraulic devices 15 and insures that the supply pressure, upon start of the movement of the shafting 1, drops less quickly and thus further accelerates the shafting 1 in the presence of reduced bearing friction. Of course, as mentioned, the lifting devices can be randomly designed according to one of the heretofore described exemplary embodiments with the exception of the arrangement of FIG. 6.

Figure 10:
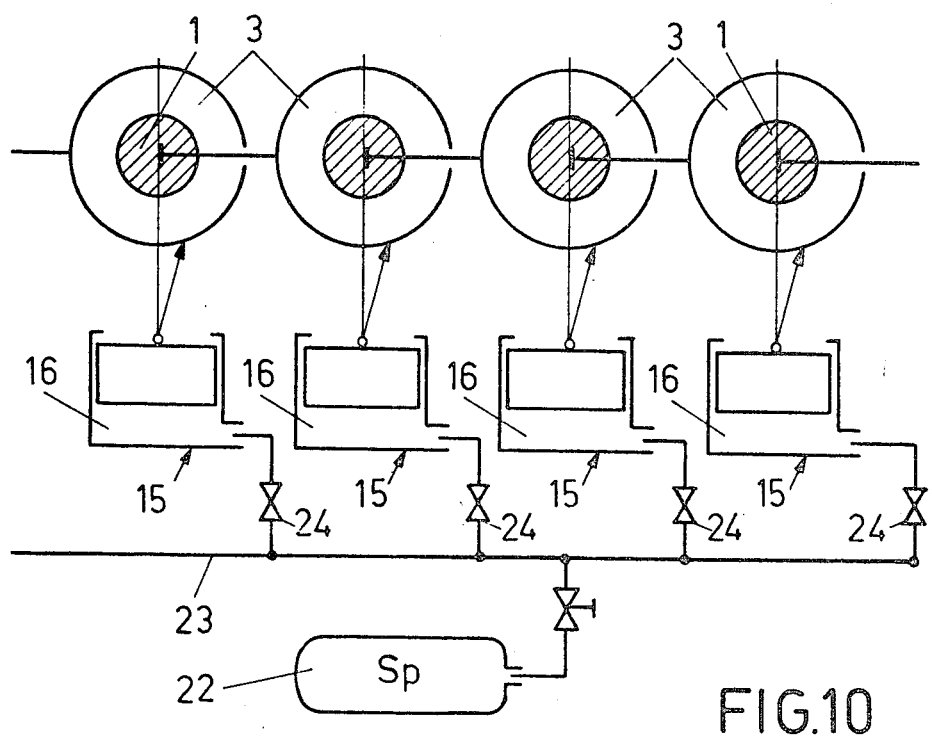
FIG. 10 illustrates an apparatus equipped with a number of individual connectable lifting devices for the individual shutting-off of each hydraulic piston.

In FIG. 10 each cylinder 16 is individually controlled by means of a valve 24, in order to individually align relative to one another the coupling flanges of two rotors which are to be interconnected during assembly.

It is within the teachings of the invention to provide a monitoring device which monitors the operation of the rotational device, the auxiliary rotational device and the lifting devices and reports disturbances in their operation. The monitoring device comprises a number of individual devices which will be described more fully hereinafter, however have not been particularly illustrated in the drawings.

There is provided a device for monitoring the operation of the rotational device and the shafting which is placed into rotation by means of such rotational device. This monitoring device comprises mechanism for indicating the rotational speed of the shafting, a device for indicating the momentary elevational position of the shafting at the lifting devices and a device for indicating the rotational moment which must be overcome.

A further device is provided for the indication of a disturbance and which prevents rotation of the shafting by means of the rotational device. Such encompasses a device for indicating a disturbance in the rotational device, a device for indicating a disturbance in the high pressure lubrication and a device for indicating an impermissible distortion or curvature of the rotor and/or the housing.

Additionally, there is provided a device for monitoring the operation of the auxiliary rotational device, the lifting devices and the shafting which is started into rotation thereby. Such embodies a device for the indication of the rotational speed of the shafting, a device for the indication of the lifting of the shafting by means of the lifting devices, and a device for the indication of the rotational moment which is to be overcome by the auxiliary rotational device.

Finally, there is provided an automatic mechanism which checks possibly arising disturbances during operation of the rotational device, the auxiliary rotational device and the lifting devices, then carries out a programmable analysis thereof and reports existing disturbances. On the basis of such information the operator then can render a decision as to the further steps which are to be carried out.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. An apparatus for rotating multiply-mounted shafting, comprising:

a rotational device cooperating with the shafting for the continuous rotation of the shafting at a first rotational speed;
an auxiliary rotational device cooperating with the shafting for the rotation of the shafting at a second rotational speed which is lower than the first rotational speed;
at least one lifting device for lifting the shafting during rotation thereof by the auxiliary rotational device and comprising: an engaged part arranged at the shafting; an engagement member effective at the engaged part for lifting the shafting; and
a drive device for producing the necessary engagement force in order to move the engagement member.

2. The apparatus as defined in claim 1, wherein:
said engaged part comprises a shaft journal forming a section of the shafting.

3. The apparatus as defined in claim 1, wherein:
said engagement member comprises a sliding shoe equipped with a concave engaging surface.

4. The apparatus as defined in claim 3, wherein:
the sliding shoe is lubricated with oil at a high pressure.

5. The apparatus as defined in claim 1, wherein:
said engaged part comprises a coupling flange.

6. The apparatus as defined in claim 5, wherein:
said engagement member comprises a sliding shoe equipped with a concave engaging surface.

7. The apparatus as defined in claim 6, wherein:
said sliding shoe is lubricated with oil at a high pressure.

8. The apparatus as defined in claim 5, wherein: said engagement member comprises an eccentric.

9. The apparatus as defined in claim 8, further including:
an auxiliary shaft;
said drive device comprising a rotational device which imparts a rotational movement by means of the auxiliary shaft to the engagement member.

10. The apparatus as defined in claim 5, wherein:
said engagement member comprises a cam.

11. The apparatus as defined in claim 10, further including:
an auxiliary shaft;
said drive device comprising a rotational device which imparts a rotational movement by means of said auxiliary shaft to said engagement member.

12. The apparatus as defined in claim 1, wherein:
said engaged part comprises a ratchet wheel; and
said engagement member comprises a pawl which can be brought into engagement with said ratchet wheel.

13. The apparatus as defined in claim 12, wherein:
said ratchet wheel and pawl simultaneously serve as said auxiliary rotational device.

14. The apparatus as defined in claim 1, wherein:
said engaged part comprises a finely toothed-tooth rim; and
said engagement part comprises a finely toothed shoe which can be brought into engagement with said finely toothed-tooth rim.

15. The apparatus as defined in claim 14, wherein:
said tooth rim and said toothed shoe simultaneously serve as said auxiliary rotational device.

16. The apparatus as defined in claim 1, wherein:
said engagement member comprises an eccentric.

17. The apparatus as defined in claim 16, wherein:
said drive device comprises a rotational device;
an auxiliary shaft;
said rotational device imparting a rotational movement to the engagement member by means of the auxiliary shaft.

18. The apparatus as defined in claim 1, wherein:
said engagement member comprises a cam.

19. The apparatus as defined in claim 1, further including:
means for hingedly connecting the engagement member with the drive device.

20. The apparatus as defined in claim 1, further including:
a connection element hingedly connected with and between the engagement member and the drive device.

21. The apparatus as defined in claim 1, wherein:
the effective direction of the drive force of the engagement member is dispositioned such that it essentially coincides with a radial line placed through its point of attack in such a manner that the drive force only possesses a radial component.

22. The apparatus as defined in claim 1, wherein:
the effective direction of the drive force of the engagement member together with a radial line placed through its point of attack encloses an acute angle which is dimensioned such that a radial component of the drive force produces a predetermined radial movement of the shafting and a tangential component thereof produces a rotational moment which overcomes a friction moment and brings about a rotation of the shafting.

23. The apparatus as defined in claim 1, further including:
lateral stop means cooperating with said engagement member; and
restoring spring means for urging the engagement member against the lateral stop means.

24. The apparatus as defined in claim 1, further including:
an auxiliary shaft;
said drive device comprises a rotational device which imparts a rotational movement by means of the auxiliary shaft to said engagement member.

25. The apparatus as defined in claim 1, wherein:
said drive device comprises at least one hydraulic device containing a cylinder and piston.

26. The apparatus as defined in claim 25, further including:
a pressure limiting valve for limiting the hydraulic pressure.

27. The apparatus as defined in claim 25, further including:
stop means for limiting the displacement stroke of the piston.

28. The apparatus as defined in claim 27, wherein:
said engagement member comprises a sliding shoe equipped with a substantially concave engagement surface;
spring means arranged between said piston and said sliding shoe.

29. The apparatus as defined in claim 25, further including:
a control device for controlling the lifting movement of the engagement member; and
an outflow valve actuatable at a predetermined shafting position.

30. The apparatus as defined in claim 25, wherein:

said hydraulic device includes a supply line; and
storage means connected with said supply line of the hydraulic device.

31. The apparatus as defined in claim 25, further including:
a plurality of said lifting devices;
a common disconnectable storage means for said plurality of lifting devices; and
a respective valve for individually controlling each piston.

32. The apparatus as defined in claim 1, further including:
a control device for controlling the lifting movement of the engagement member.

33. The apparatus as defined in claim 1, wherein:
two of said lifting devices are symmetrically arranged relative to a vertical at a lifting location.

* * * * *